United States Patent
Rao et al.

(10) Patent No.: US 8,191,933 B2
(45) Date of Patent: Jun. 5, 2012

(54) EXTRUSION RESISTANT GASKET FACE SEAL

(75) Inventors: Justin Sanjay Rao, Cincinnati, OH (US); Scott Richard Zearbaugh, Milford, OH (US)

(73) Assignee: General Electric Company, Schenectady, NY (US)

( * ) Notice: Subject to any disclaimer, the term of this patent is extended or adjusted under 35 U.S.C. 154(b) by 284 days.

(21) Appl. No.: 12/174,091

(22) Filed: Jul. 16, 2008

(65) Prior Publication Data

US 2010/0013220 A1 Jan. 21, 2010

(51) Int. Cl.
*F16L 23/00* (2006.01)

(52) U.S. Cl. ........ 285/368; 285/352; 285/364; 285/406; 285/412; 277/608; 277/611; 277/619

(58) Field of Classification Search .......... 285/351–352, 285/364, 368, 406, 412, 414, 917; 277/608–609, 277/611, 619, 630, 638
See application file for complete search history.

(56) References Cited

U.S. PATENT DOCUMENTS

| | | | | |
|---|---|---|---|---|
| 2,857,184 A | * | 10/1958 | Mancusi, Jr. ............ | 277/468 |
| 3,167,322 A | * | 1/1965 | Aichroth ................. | 277/453 |
| 3,398,978 A | * | 8/1968 | Gasche ................... | 285/187 |
| 3,704,021 A | * | 11/1972 | Barbarin et al. ......... | 277/611 |
| 3,888,496 A | * | 6/1975 | Dryer ..................... | 277/619 |
| 4,002,344 A | * | 1/1977 | Smith .................... | 277/609 |
| 4,034,993 A | * | 7/1977 | Okada et al. ............ | 277/611 |
| 4,484,771 A | * | 11/1984 | Schulz ................... | 285/368 |
| 4,625,978 A | * | 12/1986 | Jelinek .................. | 277/641 |
| 4,674,756 A | | 6/1987 | Fallon et al. | |
| 4,776,600 A | * | 10/1988 | Kohn ..................... | 277/611 |
| 5,316,320 A | * | 5/1994 | Breaker ................. | 277/611 |
| 5,427,386 A | * | 6/1995 | Breaker ................. | 277/627 |
| 5,564,715 A | * | 10/1996 | Wallace ................. | 277/612 |
| 5,938,246 A | * | 8/1999 | Wallace et al. .......... | 285/351 |
| 6,708,984 B1 | * | 3/2004 | North et al. ............. | 277/608 |
| 2002/0030326 A1 | | 3/2002 | Bettencourt | |

FOREIGN PATENT DOCUMENTS

| | | |
|---|---|---|
| DE | 19507854 | 9/1995 |
| GB | 619435 | 3/1949 |
| GB | 865943 | 4/1961 |
| WO | 2006107798 | 10/2006 |

OTHER PUBLICATIONS

Composite Sealing Systems: Products, Markets, Solutions Oct. 2008, [online], [retrieved on Jan. 6, 2010] Retrieved from the Parker Hannifin Corporation Database using Internet <URL: (http://www.darcoid.com/images/uploads/pdfs/CSS%205110.pdf>.

* cited by examiner

*Primary Examiner* — Aaron Dunwoody
*Assistant Examiner* — Fannie Kee
(74) *Attorney, Agent, or Firm* — David J. Clement; Trego, Hines & Ladenheim, PLLC

(57) ABSTRACT

A seal assembly for a fluid coupling includes: (a) a generally planar, substantially rigid seal retainer with opposed first and second faces, having an annular first groove formed in the first face; (b) a first resilient seal disposed in the first groove; and (c) an annular first backup ring positioned radially outboard of the first resilient seal and secured to the first resilient seal, wherein the first backup ring is substantially harder than the first resilient seal.

18 Claims, 5 Drawing Sheets

EXTRUSION RESISTANT GASKET FACE SEAL

STATEMENT REGARDING FEDERALLY SPONSORED RESEARCH AND DEVELOPMENT

The U.S. Government may have certain rights in this invention pursuant to contract number N00019-96-C-0176 awarded by the Department of the Navy.

BACKGROUND OF THE INVENTION

This invention relates generally to fluid couplings and more particularly to sealing arrangements for fluid couplings.

Certain aircraft gas turbine engines employ fluid systems operating at higher than average pressures, and are thus prone to leakage. For example, in some applications, fuel at 28 MPa (4000 psi) is used as a working fluid to operate multiple engine actuators. Because of the high pressures and high fuel flows, a type of coupling known as a 4-bolt flange face seal is used to make fluid connections between the various components. Based upon extrusion analysis, a standard type of seal would require a thicker flange than what is normally used in moderate-pressure systems, in order to prevent the flange from lifting off the seal. This thicker flange adds weight to the overall design and the seal will still be susceptible to failure if the flange is not clamped properly during assembly.

Historically, 4-bolt flange face seals would incorporate one of two types of seal designs: (1) a combination metal and elastomer flange gasket, such as those sold under the GASK-O-SEAL brand name by Parker Hannifin Company, Cleveland, Ohio 44124 USA; or (2) a loose L-shaped cross-section elastomer seal with a mating backup ring. The standard flange gasket consists of a metal retainer plate with an elastomer seal on each side. The seal is permanently attached to the retainer plate for simplification in maintainability and assembly. One side of the seal is compressed against the flange and the other seal is compressed against the mating component or flange. The negative aspect of the flange gasket type design is that it is limited under high pressures and requires a small clearance gap to be maintained to prevent seal extrusion. This requires a thick, stiff flange connection to limit bending in the flange.

The loose L-shaped elastomer sits in a seal gland in the mating component or flange. A flange is then clamped over the seal to provide a compression force on the seal. This design has maintainability limitations, as there is no visual indicator that verifies that the seal is installed in the seal gland. The seal can also be installed in an inverted position that will cause the backup ring to be in the bottom of the gland, rendering it useless during operation. This type of seal also requires precision-machined glands in the flange for proper operation.

BRIEF SUMMARY OF THE INVENTION

These and other shortcomings of the prior art are addressed by the present invention, which provides a bolted flange gasket seal incorporating an integral anti-extrusion feature.

According to one aspect, a seal assembly for a fluid coupling includes: (a) a generally planar, substantially rigid seal retainer with opposed first and second faces, having an annular first groove formed in the first face; (b) a first resilient seal disposed in the first groove; and (c) an annular first backup ring positioned radially outboard of the first resilient seal and secured to the first resilient seal, wherein the first backup ring is substantially harder than the first resilient seal.

According to another aspect of the invention a fluid coupling includes: (a) a first ferrule having a bore passing therethrough and a sealing face disposed at one end thereof; (b) a second ferrule having a bore passing therethrough and a sealing face disposed at one end thereof; (c) a generally planar, substantially rigid seal retainer clamped between the sealing faces of the ferrules, the seal retainer having opposed first and second faces, each face having an annular groove formed therein; and (d) a seal ring disposed in each of the grooves, comprising: (i) a resilient annular seal; and (ii) an annular backup ring positioned radially outboard of the resilient seal and secured to the resilient seal, wherein the backup ring is substantially harder than the resilient seal.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
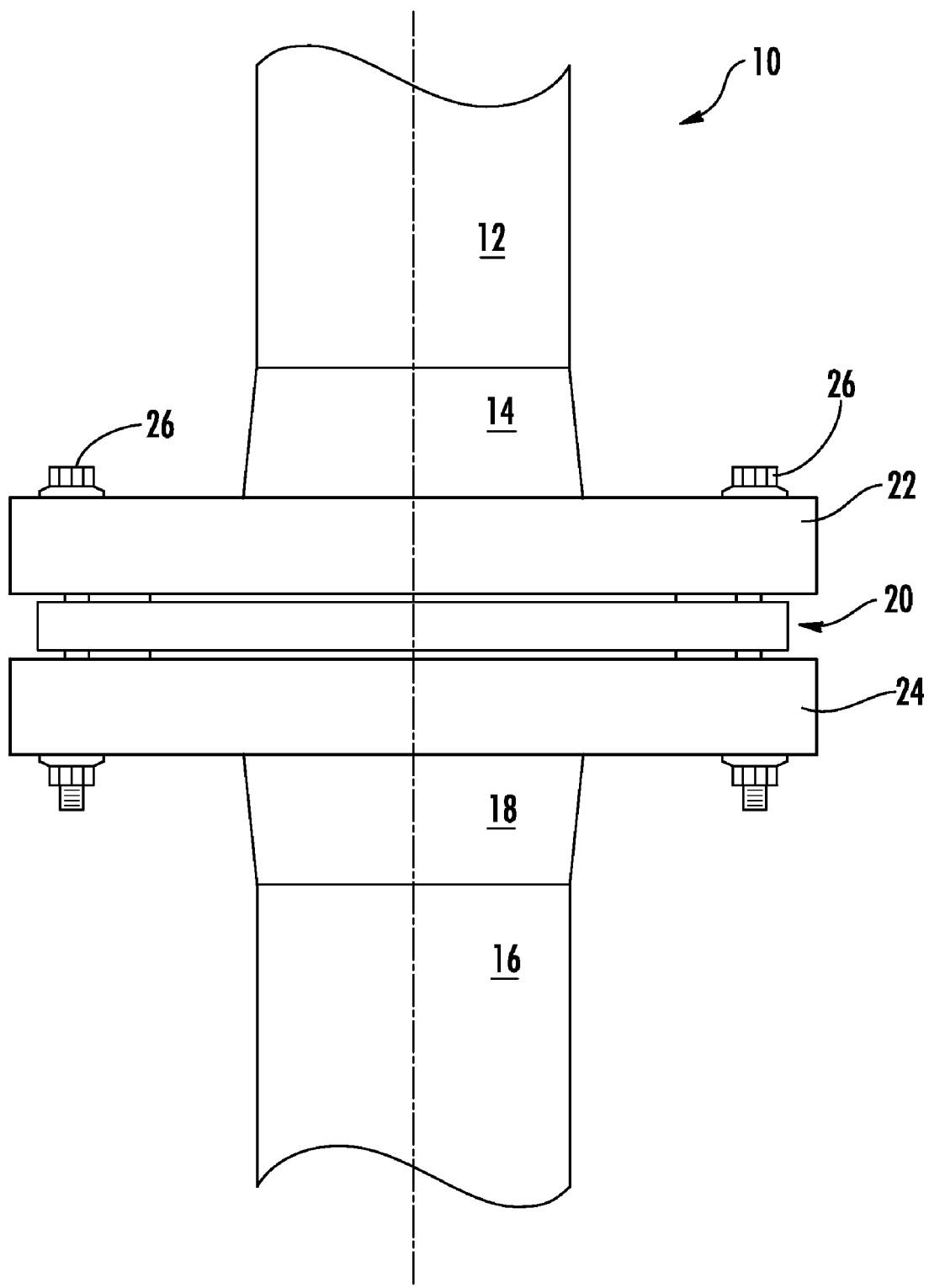
FIG. 1 is a side view of a fluid coupling constructed according to an aspect of the present invention.

Referring to the drawings wherein identical reference numerals denote the same elements throughout the various views, FIG. 1 depicts a fluid coupling assembly 10 comprising a first conduit 12 connected to a first ferrule 14 and a second conduit 16 connected to a second ferrule 18. A seal assembly 20 is disposed between the ferrules 14 and 18. The ferrules 14 and 18 are clamped together between a pair of plate-like flanges 22 and 24, which are secured with clamping means such as the illustrated bolts 26. In the illustrated example, the first and second conduits 12 and 16 comprise metallic tubing carrying fluid used as a high pressure hydraulic working fluid in a gas turbine engine, for example at about 28 MPa (4000 psi). The principles of the present invention are applicable anywhere a reliable fluid face seal is required.

Figure 2:
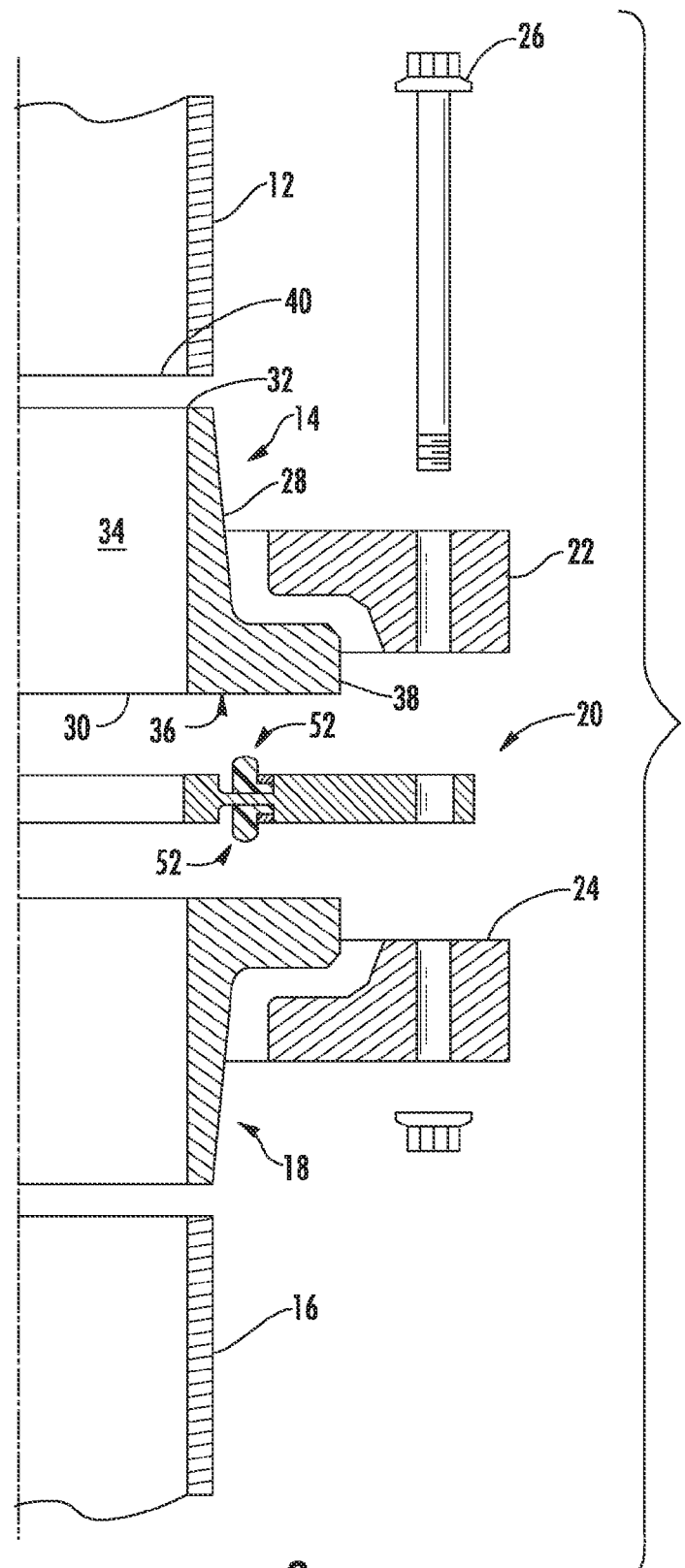
FIG. 2 is an exploded half-sectional view of the fluid coupling of FIG. 1.

FIG. 2 is a half-sectional, exploded view of the components of the fluid coupling 10. The first ferrule 14 is substantially rigid and may be constructed from a material such as a steel or aluminum alloy. It has a generally cylindrical body 28 with first and second ends 30 and 32, and a central bore 34 passing therethrough. A sealing face 36 is disposed at the first end 30. An annular rim 38 extends radially outward from the body 28. The first conduit 12, which may be pipe or tubing of a known type, has an open end 40 which is joined to the second end 32 of the first ferrule 14 in a fluid-tight joint, for example using fasteners, adhesives, or thermal or sonic bonding. In the illustrated example the first conduit 12 and the first ferrule 14 are joined by a butt weld.

The second ferrule 18 and the second conduit 16 are identical in construction to the first ferrule 14 and the first conduit 12, respectively, and they are joined to each other in a similar manner.

Figure 3:
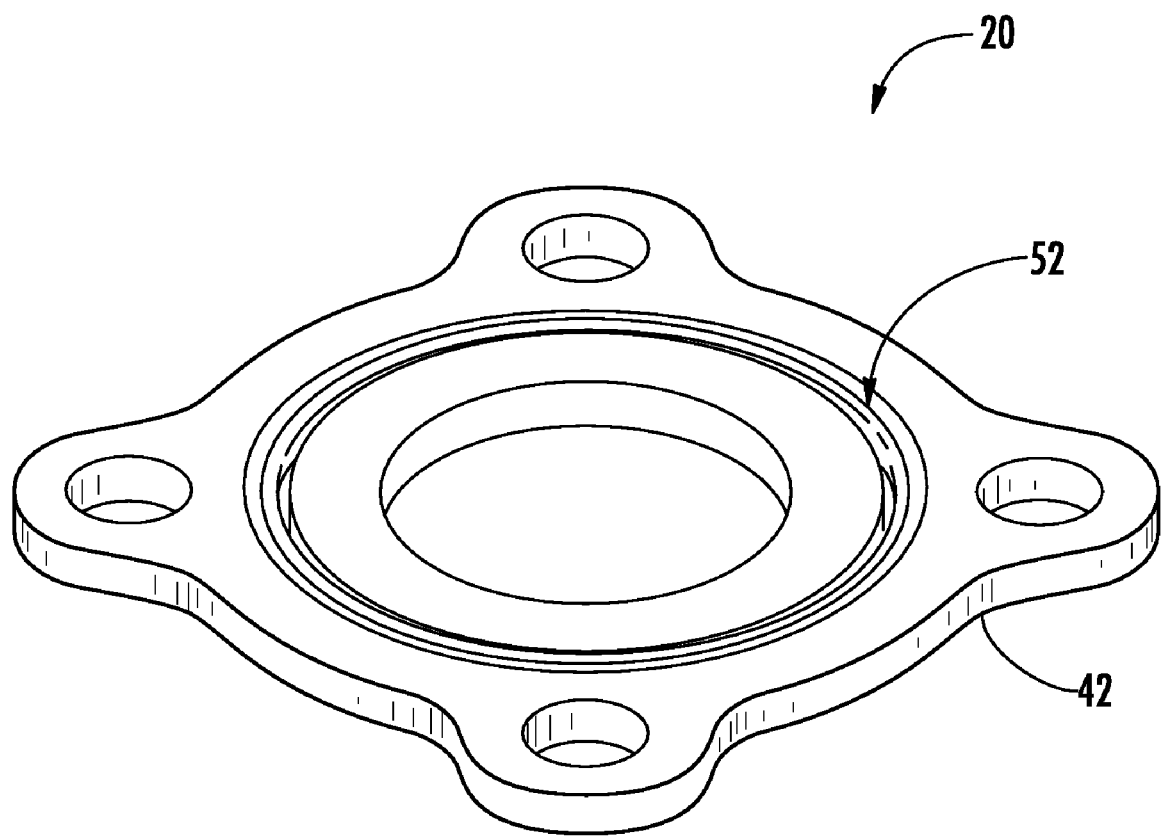
FIG. 3 is a perspective view of a seal assembly shown in FIG. 1.
Figure 4:
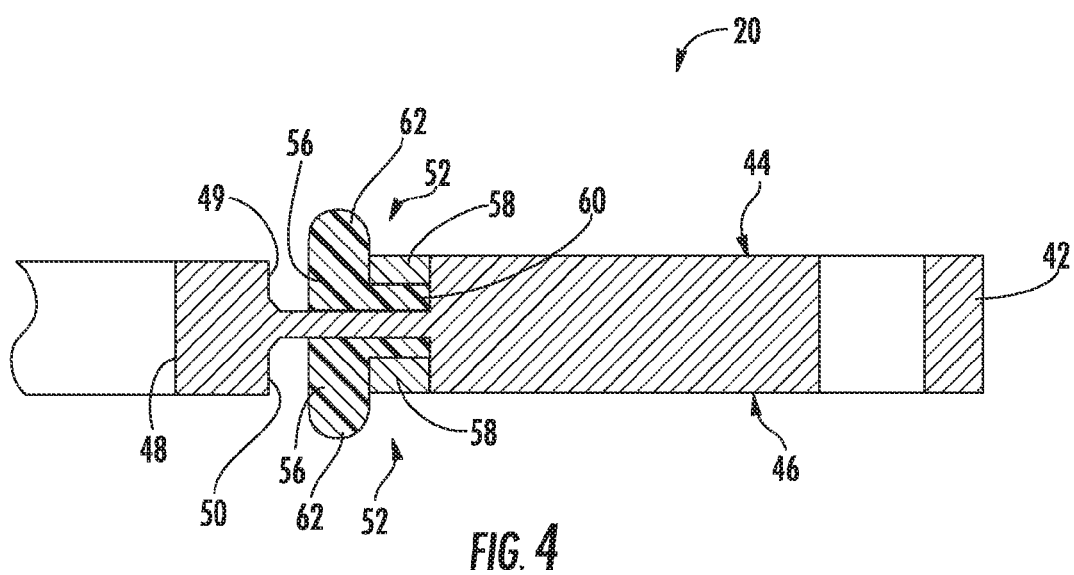
FIG. 4 is a half-sectional view of the seal assembly of FIG. 3.

FIGS. 3 and 4 illustrate the construction of the seal assembly 20. It includes a substantially rigid, generally planar seal retainer 42 with opposed first and second faces 44 and 46, and a central opening 48 for passing fluid flow. Examples of suitable materials for the seal retainer 42 include steel and aluminum alloys. Annular grooves 49 and 50 are formed in the first and second faces 44 and 46, respectively. Identical seal rings 52 are disposed in the grooves 49 and 50.

The seal ring 52 comprises a resilient seal 56 and a backup ring 58. The resilient seal 56 may be constructed from any resilient material which is compatible with the expected physical and chemical conditions to be encountered in operation. In the illustrated application, which is intended for use with high-pressure liquid hydrocarbon fuel, a fluorocarbon polymer such as polytetrafluoroethylene (PTFE) is one example of a suitable material. The hardness (Durometer) rating of the resilient seal 56 will vary depending upon the application, with softer materials being used where low ambient temperatures are expected. In the illustrated example, the resilient seal 56 has a hardness of about 75 on the Shore "A" scale. The resilient seal 56 is generally "L"-shaped in cross-section, with a radial leg 60 and an axial leg 62. The axial leg 62 has a convex, rounded distal end, and is sized to protrude from the first face 44 of the seal retainer 42 in the free state. The amount of protrusion is determined by the amount of compression that is desired when the fluid coupling 10 is assembled.

The backup ring 58 is positioned in the "corner" formed by the radial and axial legs 60 and 62. The backup ring 58 is secured to the resilient seal 56. Examples of suitable methods of securing the two components include fasteners, adhesives, thermal or sonic bonding, and co-molding of the resilient seal 56 and the backup ring 58. The backup ring 58 is made harder than the resilient seal 56 in order to prevent the resilient seal 56 from extruding between the components of the fluid coupling 10 under pressure. In the illustrated example, any material having a hardness of about 90 Shore A or greater would be sufficient for this purpose. Many known plastics and metals can meet this hardness requirement.

Optionally, the seal rings 52 may be secured in the grooves 49 and 52, for example using fasteners or adhesives. This makes the seal assembly 20 an integral unit.

Figure 5:
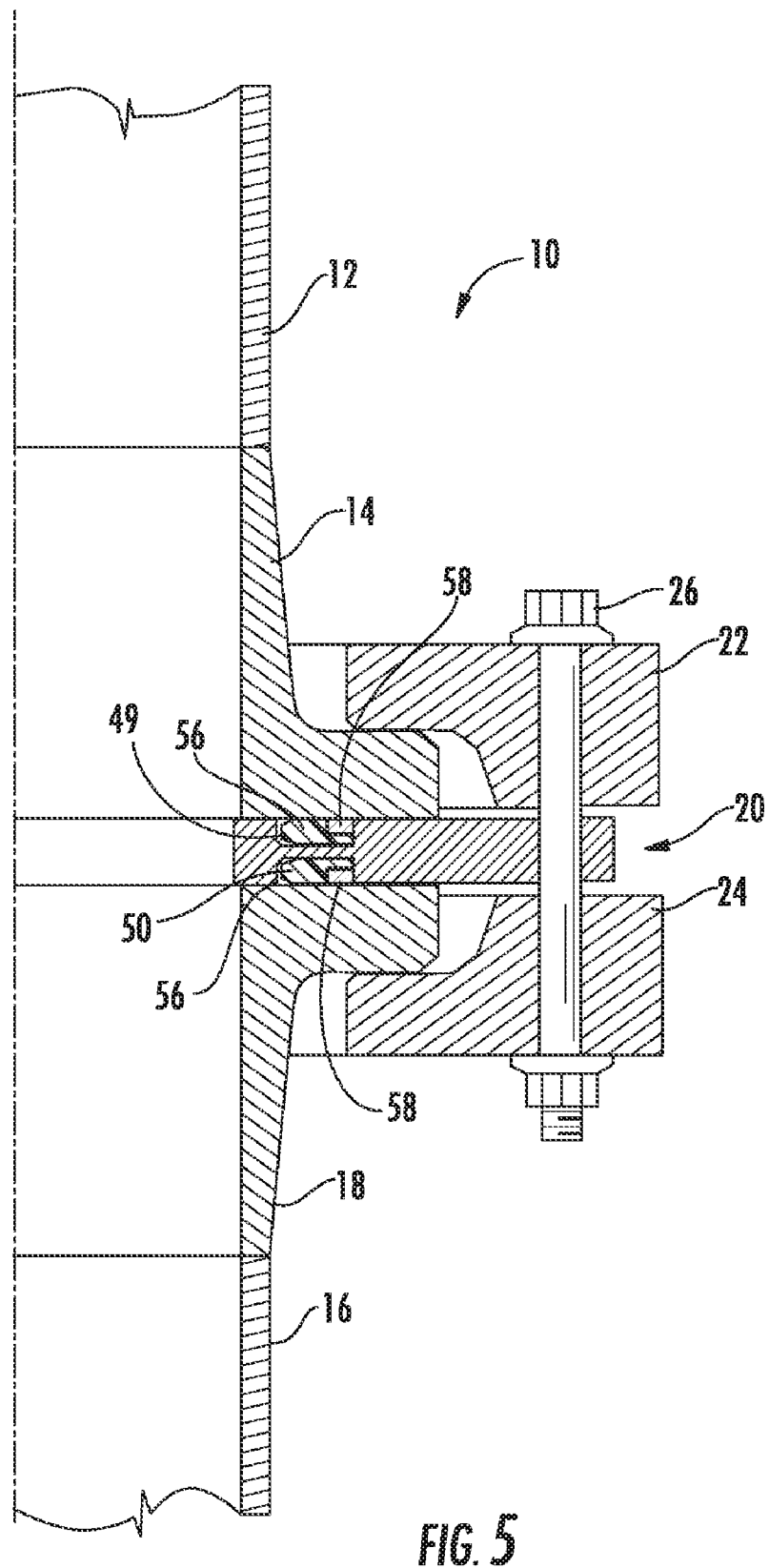
FIG. 5 is an enlarged half-sectional view of the tubing joint in an assembled condition.

FIG. 5 shows the fluid coupling 10 in an assembled condition, with the seal assembly 20 clamped between the first and second ferrules 14 and 18, which are in turn clamped by the flanges 22 and 24. The seal rings 52 are disposed in the grooves 49 and 50. The resilient seals 56 are compressed and the backup rings 58 are positioned outboard of the resilient seals 56, so they can resist outwards extrusion of the resilient seals 56. It is impossible for the backup rings 58 to be inadvertently omitted from the seal assembly 20, because they are secured to the resilient seals 56 as described above. Furthermore, the nature of the L-shaped cross-section of the resilient seals 56 makes it immediately obvious if they have been installed in an inverted position. In the case where the seal rings 52 are secured to the seal retainer 42, it is impossible to omit the seal rings 52 from the assembly. The seal assembly 20 is symmetrical, so it is further impossible to incorrectly assemble the fluid joint 10.

There are several advantages to the seal assembly described above compared to prior art flange seals, namely: (1) reduced fitting weight, (2) increased reliability of the seal, (3) easy visual verification of a properly installed seal, (4) reduced maintenance induced failures from incorrect seal installation, (5) improved maintainability from the use of minimal parts, and reduced cost from simplification of the 4 bolt flange manufacturing process. These benefits will allow for a lighter, more maintainable, and an improved reliability seal configuration.

The foregoing has described a fluid coupling configuration and seal assembly. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A seal assembly for a fluid coupling, comprising:
   (a) a generally planar, substantially rigid seal retainer with opposed first and second faces, having an annular first groove formed in the first face;
   (b) an annular first resilient seal disposed in the first groove, the first resilient seal having a sectional shape, when viewed in half-section, that is generally L-shaped with axially and radially-extending legs; and
   (c) an annular first backup ring positioned surrounding the first resilient seal in a corner defined by the radial and axial legs and secured to the first resilient seal, wherein the first backup ring is substantially harder than the first resilient seal.

2. The seal assembly of claim 1 wherein the first resilient seal is secured in the first groove.

3. The seal assembly of claim 1 wherein the axially-extending leg has a convex, curved distal end.

4. The seal assembly of claim 1 wherein the axially-extending leg extends past the first face of the seal retainer in a free state.

5. The seal assembly of claim 1 wherein the first resilient seal comprises a fluorocarbon elastomer.

6. The seal assembly of claim 1 wherein the first resilient seal has a hardness of about 75 Shore A or less.

7. The seal assembly of claim 1 wherein the first backup ring has a hardness of about 90 shore A or greater.

8. The seal assembly of claim 1 wherein the seal retainer includes an annular second groove formed in the second face, the seal assembly further comprising:
   (a) a second resilient seal disposed in the second groove; and
   (b) an annular second backup ring positioned surrounding the second resilient seal and secured to the second resilient seal, wherein the second backup ring is substantially harder than the second resilient seal.

9. The seal assembly of claim 8 wherein the second resilient seal is secured in the second groove.

10. A fluid coupling, comprising:
    (a) a first ferrule having a bore passing therethrough and a sealing face disposed at one end thereof;
    (b) a second ferrule having a bore passing therethrough and a sealing face disposed at one end thereof;
    (c) a generally planar, substantially rigid seal retainer clamped between the sealing faces of the ferrules, the seal retainer having opposed first and second faces, each face having an annular groove formed therein;
    (d) a seal ring disposed in each of the grooves, comprising:
       (i) a resilient annular seal, each of the resilient seals having a sectional shape, when viewed in half-section, that is generally L-shaped with axially and radially-extending legs; and
       (ii) an annular backup ring positioned surrounding the resilient seal and secured to the resilient seal, wherein the backup ring is substantially harder than the resilient seal, the corresponding backup ring of each seal being positioned in a corner defined by the radial and axial legs of that seal;
    (e) a first flange which bears against the first ferrule;

(f) a second flange which bears against the second ferrule; and (g) clamping means securing the flanges together.

11. The fluid coupling of claim 10 wherein the seal rings are secured in the grooves.

12. The fluid coupling of claim 10 wherein the clamping means comprises mechanical fasteners interconnecting the first and second flanges.

13. The fluid coupling of claim 10 further comprising:
(a) a first conduit secured in fluid communication with the first ferrule; and
(b) a second conduit secured in fluid communication with the second ferrule.

14. The fluid coupling of claim 10 wherein the axially-extending leg of each resilient seal has a convex, curved distal end.

15. The fluid coupling of claim 10 wherein the axially-extending leg extends past the face of the seal retainer in a free state.

16. The fluid coupling of claim 10 wherein each of the resilient seals comprises a fluorocarbon elastomer.

17. The fluid coupling of claim 10 wherein each of the resilient seals has a hardness of about 75 Shore A or less.

18. The fluid coupling of claim 10 wherein each of the backup rings has a hardness of about 90 shore A or greater.

* * * * *